United States Patent [19]

Spronck

[11] 4,350,382
[45] Sep. 21, 1982

[54] BALANCING DEVICE AND FOLDABLE PLATFORM SIDEBOARD

[76] Inventor: Emmanuel S. M. Spronck, Julianalaan 38, Margraten, Netherlands

[21] Appl. No.: 105,661

[22] Filed: Dec. 20, 1979

[30] Foreign Application Priority Data

Dec. 21, 1978 [NL] Netherlands ........................ 7812389

[51] Int. Cl.³ ............................................ B62D 27/00
[52] U.S. Cl. .................................... 296/38; 5/164 D;
49/386; 296/57 A
[58] Field of Search ..................... 296/36, 57 R, 57 A,
296/38; 105/378, 381, 387; 5/164 R, 164 B, 164 C, 164 D; 49/386, 387

[56] References Cited

U.S. PATENT DOCUMENTS

| | | | |
|---|---|---|---|
| 2,226,033 | 12/1940 | Walling | 20/16 |
| 2,797,956 | 7/1957 | Schlotthauer | 296/36 |
| 3,552,060 | 1/1971 | Boyle | 49/202 |
| 3,574,391 | 4/1971 | Doboze | 296/57 R |
| 3,851,344 | 12/1974 | Zeithammer | 5/164 D |
| 3,858,253 | 1/1975 | Lauzon | 5/164 R |

FOREIGN PATENT DOCUMENTS

| | | | |
|---|---|---|---|
| 869446 | 8/1978 | Belgium . | |
| 2025264 | 4/1970 | France . | |
| 2307674 | 11/1976 | France . | |
| 6816981 | 5/1969 | Netherlands . | |
| 309693 | 4/1929 | United Kingdom | 296/57 A |
| 719336 | 12/1954 | United Kingdom | 296/57 A |

Primary Examiner—Joseph F. Peters, Jr.
Assistant Examiner—Ross Weaver
Attorney, Agent, or Firm—Morse, Altman, Oates & Dacey

[57] ABSTRACT

A balancing device for a portion (2), rotable about a horizontal axis (4) in a frame and provided with a lever arm (21) fixedly connected to the portion (2) to be balanced, a spring member (26) by means of a pull-or press member (40) connected to the lever arm (21) in which the pull-or press member (40) is directed through an approx. fixed point (30') in the frame and whereby in the position wherein the center of gravity (20) of the part to be balanced is positioned precisely above the hinge pin, the direction of the pulling or pressing forces (40) extends in longitudial direction of the lever arm (4-32-30'), the spring (26) having a linear characteristic and being biased in a special way, the balancing device being especially suited for a platform sideboard or a tilting cab.

2 Claims, 7 Drawing Figures

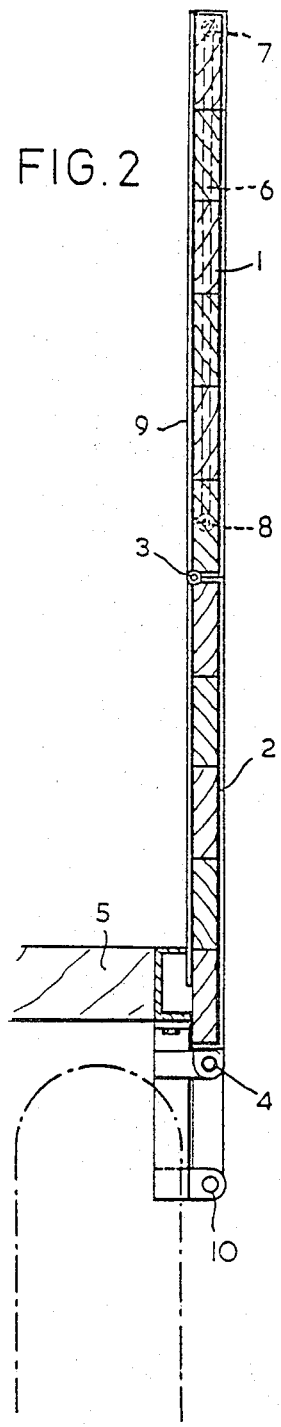
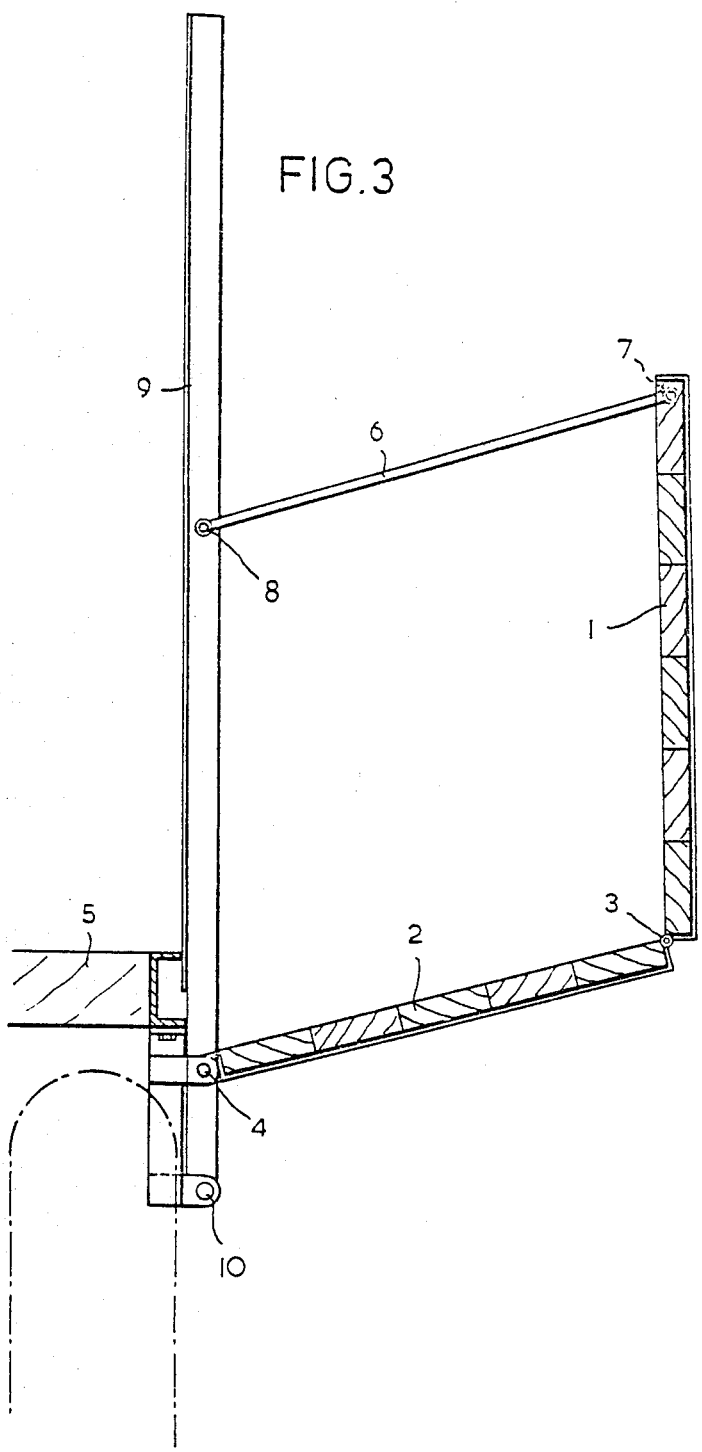

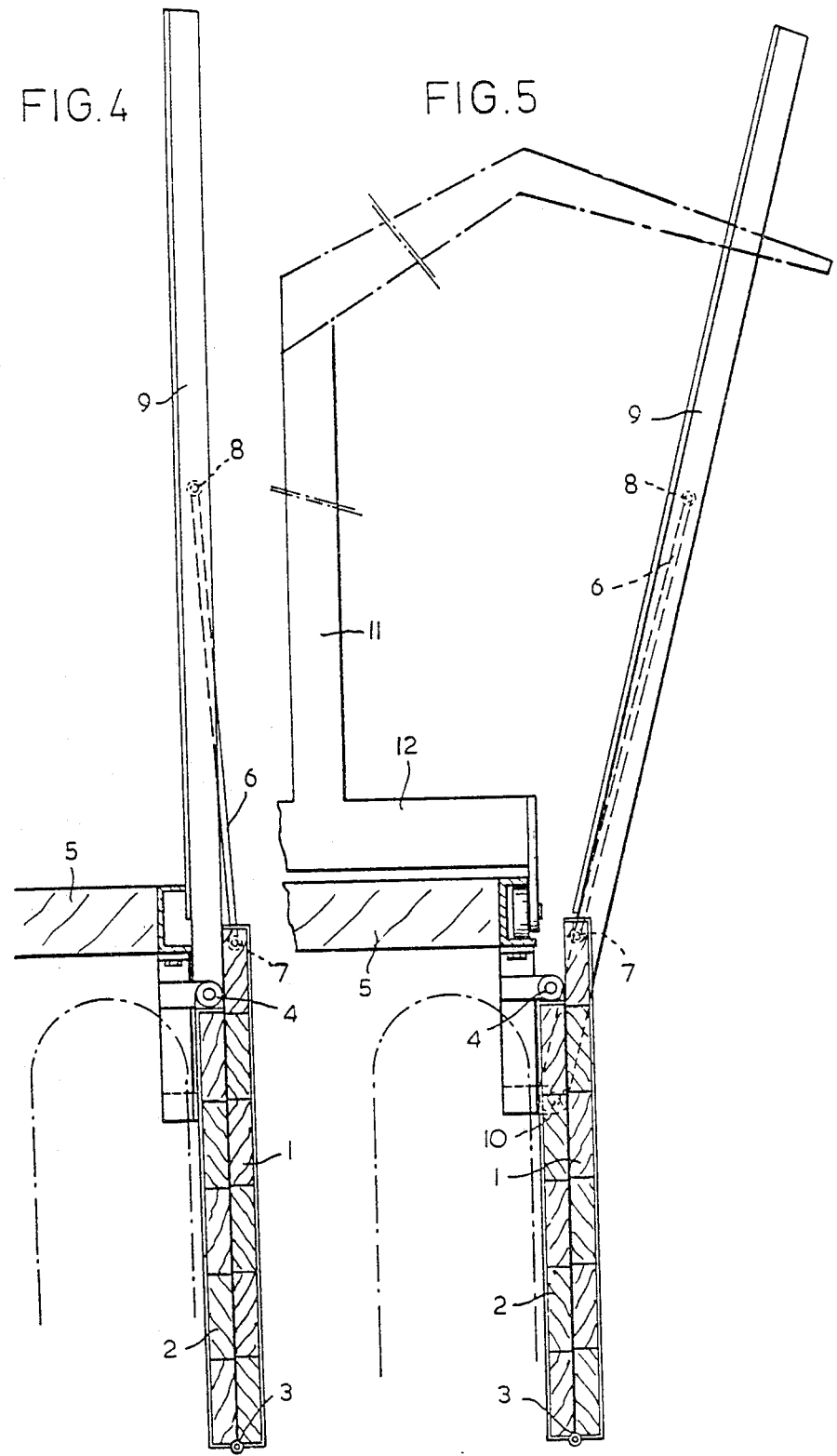

BALANCING DEVICE AND FOLDABLE PLATFORM SIDEBOARD

The invention relates to a balancing device which is in particular also suitable for balancing a foldable platform sideboard, such as for trucks and trailers, swing-up cabs and other pivoting portions, as well as to a foldable platform sideboard.

With a normal hinge construction the operating personnel has to take up the weight of the hinged portion, which either sets limits to the weight and the dimensions of the hinged portion, e.g. a platform sideboard, or requires more persons for lifting and lowering the portion in question.

It is known to balance a pivoting portion at least partly by a spring. Use is also made sometimes of a hydraulic operation, e.g. of a swing-up cab of a truck, for the purpose of pivoting such a construction.

It is the object of the invention to provide an improved balancing device enabling to fully balance the hinged portions.

To this end, in a balancing device, for a portion rotatable about a horizontal axis in a frame, and provided with a lever arm affixed with one end to the portion to be balanced, a spring member likewise mounted in the frame engaging adjacent the other end of the lever arm, it is proposed according to the invention that said other end of the lever arm is engaged by a pull or press member pivotally connected therewith, said pull or press member being connected to a spring and said pull or press member being so mounted that the pulling or pressing force on the lever arm in all positions of said arm extends through a point of the frame that is approximately fixed at any rate during the hinge action, whereby in the position wherein the centre of gravity of the part to be balanced is positioned just above the hinge pin thereof, the direction of the pulling or pressing force extends in longitudinal direction of the lever arm, while the length along which the spring, having a lineary characteristic, is biassed, is exactly identical to the distance between the fixed point on the frame and the point of application of the pull or press member on the lever arm.

Naturally the length of the lever arm in combination with the spring force is so determined that the part to be balanced in a given position is retained in equilibrium. It has been found that by the choice of the fixed point on the frame through which extends the force of the pull member with the indicated spring bias, the part to be balanced is fully balanced in any angular position.

It is observed that the balancing device is not restricted to an angle smaller than 90°, 180°, or even 360° or more or other specific angles, but that independently of the initial or end point of the hinge movement and at all angles, both to the left and to the right, the proper balancing is ensured.

It is observed that a platform sideboard for a vehicle, in a simple embodiment, is hingedly attached to or adjacent the platform floor. The maximum height of the platform sideboard may thereby not be larger than the distance between the floor and the ground level, since otherwise the platform sideboard in lowered position hangs on the ground, as a result of which difficulties during displacement and during loading and unloading are encountered. A limited sideboard height also leads to a limitation of the load and hence to higher carriage rates.

When as a matter of fact the load is higher than the platform sideboard, a part of the load may easily proceed to move and fall off the vehicle, which is undesirable also from a safety viewpoint.

According to a further embodiment of the invention, it is now proposed in a platform sideboard comprising at least two parts which are hingedly interconnected at their adjoining horizontal sides and whereby the bottom edge of the lower portion is hinged to or adjacent the platform floor, while the top side of the upper portion of the platform sideboard is hinged to the end of guide means, to connect other ends of said guide means hingedly to an upright portion at the platform floor, e.g. the uprights of the platform, in such a way that said upright portion, the guide means and two portions of the platform sideboard form a parallelogram.

Preferably in a such designed sideboard, in closed position, substantially all hinges and pivot points lie in a vertical place, while in opened position, depending on the place and the length of the guide rods, the two parts of the sideboard are positioned adjacent and against each other. In this manner the maximal height of the sideboard may be considerably more than the distance between platform floor and the ground.

Some embodiments of the invention will now be explained, by way of example, with reference to the accompanying drawings, likewise showing further particulars of the invention.

FIG. 6 diagrammatically shows a balancing device according to the invention;

Figure 1:
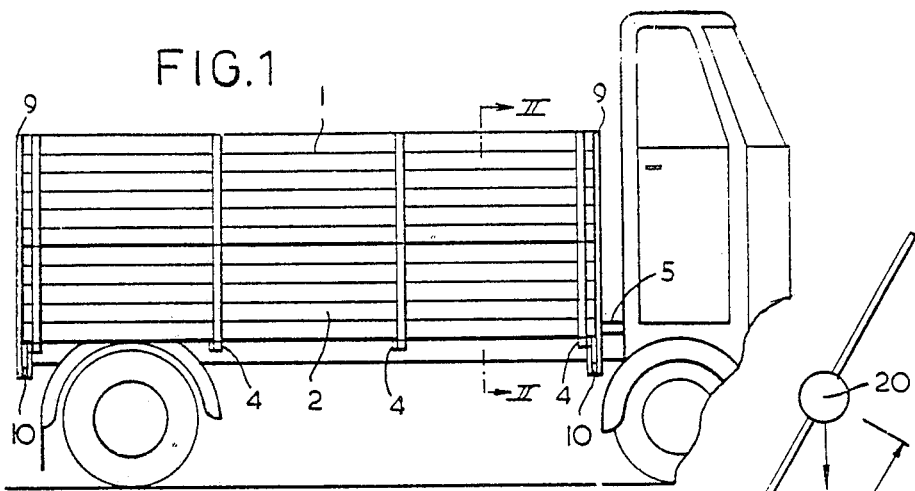
FIG. 1 is a side view of a truck having a platform sideboard according to the invention.

FIG. 2 diagrammatically shows a cross section of a part of a truck on the line II—II in FIG. 1, with the sideboard being closed; FIG. 3 shows in accordance with FIG. 2, a sideboard in half-open position;

FIG. 4 shows a different embodiment of a platform sideboard; and

FIG. 5 concerns a variant embodiment wherein use is made of outwardly pivoting uprights so that use may be made of a rail guide for a cargo crane.

Figure 6:
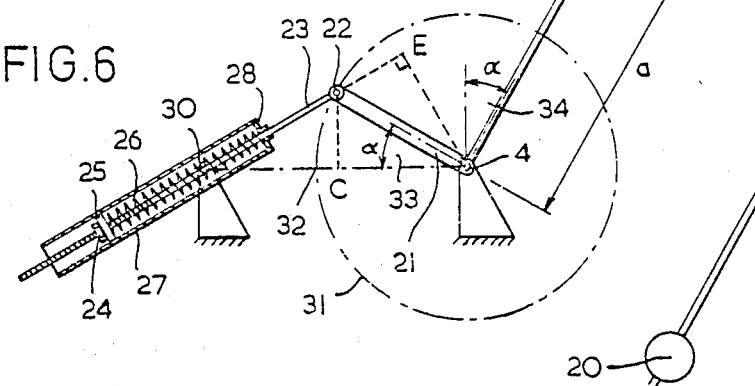

A balancing device according to the invention is diagrammatically shown in FIG. 6.

The hinge portion to be balanced is shown by 2, while the centre of gravity is indicated by 20. The distance from said centre of gravity 20 to a pivot pin 4 of the portion 2 to be balanced is indicated by a. A lever arm 21 is fixedly connected to the hinge portion 2. The end of said lever arm engages at 22 a pull member 23. Said pull member, in FIG. 6 a rod, is fitted with an adjustable nut 24 and spring cup 25 against which rests a compressing spring 26. Said spring 26 is disposed in a spring housing 27 with spring cup 28, against which the other end of spring 26 rests. The spring housing 27 is pivotally mounted at 30 to a frame, not shown, whereon likewise the pin 4 is mounted. The point 22 may be displaced on a circle 31 around the center 4. On the connection line between pivot pin 4 and pivot point 30 there is present the point 32 on the circle 31. When the pull rod 23 and the lever arm 21 are co-extensive, the point 22 coincides with point 32. In this position the centre of gravity 20 is precisely above the pivot pin 4 in that the angle 33 between the lever arm 21 and the connection line 30-4 is equal to the angle 34 between the hinge portion 2 and the vertical.

In the example these angles are indicated by $\alpha$.

It has been found that when in the position wherein α=0, so the centre of gravity 20 being precisely above the pivot pin 4, the pull rod 23 and the lever arm 21 are co-extensive and the length along which the spring 26 is biassed is just equal to the distance 30-32, the part 2 is fully balanced in any angular position when this part is balanced in one position only.

This may be explained as follows, it being understood:

30=A
32=B
22=D
4=M while furthermore, in elucidation of FIG. 1, is indicated the point C perpendicular underneath 22 under the line AM, while the point E indicates the perpendicular from the point 4 or M on the extension of the pull rod 23.

In FIG. 1 then applies:

$$AD = \sqrt{(AM - BM \cdot \cos\alpha)^2 + (BM \cdot \sin\alpha)^2}$$

$$ME = \frac{AM \times DC}{AD} = \frac{AM \times BM \cdot \sin\alpha}{AD}$$

The torque exerted by the part to be balanced about the pivot pin 4 (or the point M) is $G \times s \cdot \sin\alpha$. The spring-produced torque is determined by the force of the spring, i.e. the spring constant $C \times$ the compression. Said compression in the stretched position, so the position wherein point 22 and 32 (D=B) coincide, is equal to the distance AB. (The bias was equal to the distance 30-32 or A-B).

In a random position said spring force is $AD \times C$. This force exerted by the spring acts on the lever arm 21, viz. proportional to the effective arm length ME. As a result it applies for the spring-exerted torques $C \times AD \times ME$. When ME is replaced therein by $AM \times BM \cdot \sin\alpha/AD$ this becomes $C \times AM \times BM \cdot \sin\alpha$.

The balancing moment supplied is therefore directly proportional to $\sin\alpha$, while the required balancing moment for the weight C is equal to $G \times a \cdot \sin\alpha$. It follows there from that for each angle the whole is equilibrium if: $G \times a \cdot \sin\alpha = C \times AM \times BM \cdot \sin\alpha$ or $G \times a = C \times AM \times BM$.

In this formula there are only constants, viz. G, a, C, AM and BM. When therefore the various magnitudes are so chosen that this equation is valid for one position, the equilibrium is ensured in any angular position of the part 2 to be balanced. It is observed that possibly the pivot point 30 (A) may be movably designed in particular also on the line 30-4 (AM). This may be advantageous when previously the accurate weight G of the part 2 to be balanced is not known, or variable so that adjustment is required. At a random position the point 30 may then be displaced so that the part to be balanced is just fully balanced. Thereafter the balancing is also complete then in any other position.

It is observed that when, starting from such a completely balanced position, the point 30 is further removed from point 4, or the weight to be balanced G is smaller than calculated, still a complete balancing can be obtained at one given angular position by adapting the bias of the spring by means of the nut 24. In that particular position there is then obtained, true, a complete balancing, but this results in that at an angular position of:

0 to α: the balancing force ranges from too small to good;
α to 180°: ranges from good to too large;
180° to (360°−α): ranges from too large to good;
(360°−α) to 360°: ranges from good to too small.

If the distance 30-4 (AM) is selected too small or when the weight to be balanced G is larger than calculated, an inverse pattern of the balancing force will be obtained.

It is observed, that the lever arm 21 need not be oriented right-angled to the part to be balanced 2, as indicated in FIG. 6. The lever arm 21 may be positioned at a random angle relative to the part 2, provided only in the vertical position of the part 2 the pull rod 23 and the lever arm 21 are co-extensive.

It is possible to obtain a required deviation from the complete balancing by means of
(1) a change of the distance 30-4, as explained in the above;
(2) a change of the weight to be balanced or the resiliency (springconstant), as also explained in the above;
(3) a change in vertical direction of the point 30 relative to the pivot pin 4.

Naturally, also a combination of these variations is possible. Although in the embodiment the point 30 lies beyond the circle 31, this point may also lie within the circle and even on the circle, thereby nevertheless achieving a complete balancing in all positions.

The distance 30-4 (AM) is then equal to or smaller than the length of the lever arm 21. This may be desirable e.g. for swing-up cabs of trucks.

Figure 7:
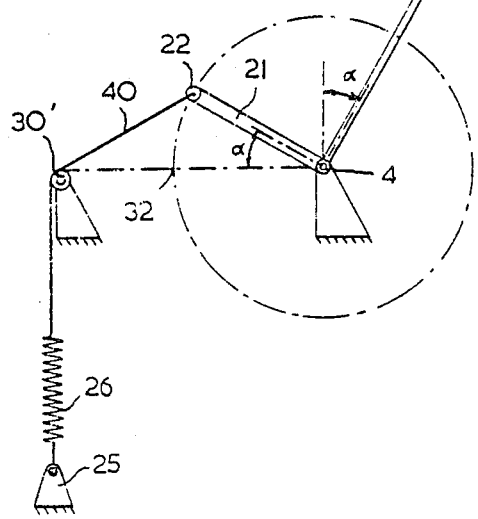
FIG. 7 shows a variant of the balancing device of FIG. 6.

FIG. 7 shows an embodiment wherein the pull rod 23 is replaced by a pulling cable 40 which is guided over a guide wheel 30'. The spring 26 may thereby be mounted at any place in the frame, in the example vertically downwards underneath the point 30'.

Instead of one guide wheel 30', also more guide wheels may be superimposed. This is in particular of importance when from the position shown in FIG. 7 and with an horizontally mounted spring, for instance a tipping through 90° counter clockwise is required.

This may be the case e.g. upon application of swing-up cabs.

It is observed that as spring member may be used any type of spring showing in the working range a substantially lineary spring characteristic, so not only of a compression spring but also of an extension spring, a hydraulic spring or of a gas spring, possibly a combination of springs.

FIG. 3 shows a platform sideboard according to a further embodiment of the invention, comprising an upper portion 41 and a lower portion 42, which are interconnected by means of hinges 43. The lower portion 42 is attached through hinges 44 to a part of the platform floor 45.

To the top edge of the upper portion 41 there are pivotally connected guide rods 46 (at 47), which rods 46 with their other ends at 48 are pivotally connected to uprights 49 of the truck, said uprights in turn are pivotally connected at 50 to a constructional member, not shown, connected to the platform floor 45. It is observed that the uprights need not always be pivotally connected, while the guide rods may also be secured to other parts of a truck construction, e.g. to end partitions.

The application of hinged uprights has the advantage that a cargo crane 51 provided with a substructure 51 which is movable in a known manner, in laterally opening sections, may unimpededly pass the uprights, as indicated in FIG. 5. The sideboards and uprights are furthermore fitted with known means for opening, closing, locking and pivoting. In the embodiment, as appears in particular from FIG. 5, use is made of a quadrangular linkage or parallelogram with substantially parallel parts 42 and 46, resp. 41 and 49, whereby the pivot point 48 is so chosen that in closed position the two parts 41 and 42 are co-extensive and all pivot points are substantially co-planar, while in entirely opened position the two side board portions are swung down side by side vertically underneath the platform floor.

It is observed that instead of a guide rod 46, use may also be made of chains or cables, which run over pulleys or sheaves and which are possibly balanced by means of weight or springs.

For longer sideboards, if desired, these may be split into a plurality of parts behind each other.

I claim:

1. A balancing device for a part rotatable about a horizontal axis in a frame comprising:
   (a) a lever arm fixedly connected with one end at said horizontal axis to said part to be balanced so as to define a right angle therewith, said horizontal axis being fixed in said frame and said part to be balanced is fully balanced in any angular position of said part when said part is balanced in only one angular position thereof;
   (b) a pull or press member pivotally mounted about a point of said frame and being pivotally connected to the other end of said lever arm, said pull or press member being a pulling cable guided over a guide wheel disposed at said point of said frame, said point and said horizontal axis being located in the same plane, said point of said frame being adjustably mounted in said frame and being fixed in said frame when said part is balanced in said only one angular position;
   (c) a spring member having linear characteristics mounted in said frame and operatively connected to said pull or press member;
   (d) said pivotal connection between said pull or press member and said lever arm being at least partially displaceable about a circle concentric about said horizontal axis, with said lever arm defining the radius of said circle;
   (e) said pull or press member being so mounted about said point that any pulling or pressing force exerted thereby on said lever arm in all positions of said lever arm about said circle extends through said point, whereby in a position wherein the center of gravity of said part to be balanced is positioned directly above said horizontal axis, the direction of said pulling or pressing force extends in a longitudinal direction defined by said lever arm, with the length along which said spring member is biased being equal to the distance between said point of said frame and said pivotal connection between said pull or press member and said lever arm, with said point of said frame being adjustable along said longitudinal direction defined by said lever arm when said lever arm is in a horizontal plane, with said horizontal axis, said point of said frame and said pivotal connection of said pull or press member to said other end of said lever arm all being located in said horizontal plane when said lever arm is in said horizontal plane.

2. The balancing device of claim 1 wherein said pull or press member is a pull rod, said spring member is a compression spring, said spring being disposed in a housing, with said housing being pivotally mounted about said point of said frame at a location about midway of said housing.

* * * * *